Patented July 15, 1924.

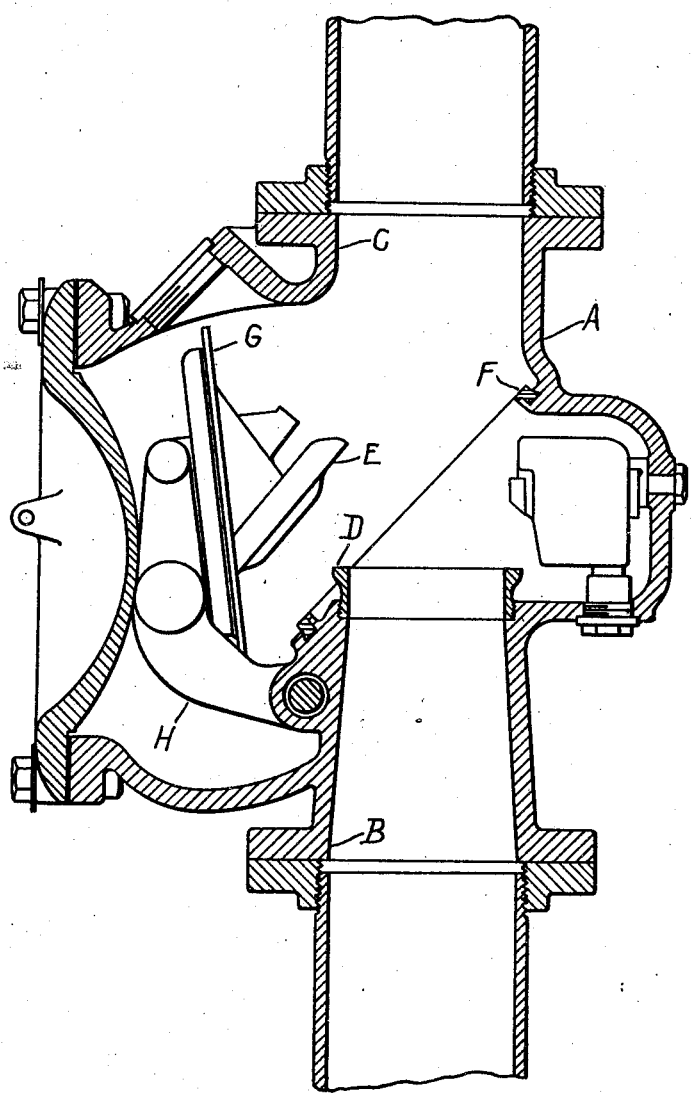

1,501,125

UNITED STATES PATENT OFFICE.

ALBERT J. LOEPSINGER, OF PROVIDENCE, RHODE ISLAND, ASSIGNOR TO GENERAL FIRE EXTINGUISHER COMPANY, OF NEW YORK, N. Y., A CORPORATION OF NEW YORK.

VALVE FOR AUTOMATIC SPRINKLER SYSTEMS.

Application filed April 4, 1919. Serial No. 287,469.

*To all whom it may concern:*

Be it known that I, ALBERT J. LOEPSINGER, of the city and county of Providence and State of Rhode Island, have invented certain new and useful Improvements in Valves for Automatic Sprinkler Systems; and I do hereby declare the following specification, taken in connection with the accompanying drawings, forming a part of the same, to be a full, clear, and exact description thereof.

My invention relates to improvements in valves intended for the control of water or other liquids and is particularly adapted for use in automatic sprinkler systems. Such valves are ordinarily installed in pipe lines, and are provided with an inlet and an outlet of the same and uniform internal diameter and substantially the same as that of the pipe, and an enlarged valve-casing located between the inlet and the outlet, of sufficient size and of a shape suitable to contain the valve and other necessary mechanism. In certain types of valves, as for example dry pipe valves such as are used in dry pipe automatic sprinkler systems, this mechanism is necessarily relatively large and requires considerable space and a correspondingly large valve-casing to contain it.

In valves of this character as heretofore constructed having an inlet and an outlet having the same and uniform internal diameter and substantially the same as that of the pipes, I have found that the flow of water through the valve-casing suffers a loss of energy or pressure. This is primarily due to the fact that the stream in issuing from the inlet into the enlarged casing gradually diverges and spreads out into a fan shape thereby gradually becoming larger than the valve outlet. It will therefore be seen that said stream cannot enter said valve outlet without a rearrangement of the stream filaments and consequent loss of pressure. Furthermore the stream as it enlarges in its passage through the valve-casing is further impeded and a further rearrangement of the stream filaments is produced by its contact with the working mechanism contained within the casing.

The principal object of the present invention is to provide a valve-casing of smaller size than heretofore possible, thereby permitting the use of correspondingly smaller valves and operating mechanism.

A further object of the invention is to provide a valve-casing in which the inlet opening is so constructed as to increase the velocity of the liquid as it passes therethrough, so that it does not readily increase in diameter and passes through the valve-casing and enters the outlet opening with but little disturbance from the working parts or the surrounding water therein.

A further object of the present invention is to provide a valve-casing of the above character without any appreciable diminution or loss in volume or flow of water through said casing and with but slight loss of pressure.

To these ends the invention consists in the novel construction, combination and arrangement of parts hereinafter described and more particularly set forth in the claims.

In describing the invention in detail reference will be made to the accompanying drawing which is a longitudinal sectional view of a dry pipe valve embodying my invention.

In the drawing, A represents the valve-casing which is provided with an inlet opening B in the form of a truncated cone communicating with the water supply pipe and a straightway outlet opening C communicating with the riser of a sprinkler system and of substantially the same internal diameter as said riser.

The inlet opening is provided with a valve-seat D for the water-valve E and the valve-casing is provided with an angularly arranged valve-seat F for the air-valve G. Said water-valve and air-valve are connected together and are carried by a swinging arm H, one end of which is secured to the air-valve, and the other end pivoted to the valve-casing.

With the above construction it will be seen that by providing the valve with the converging or cone shaped inlet, not only is the size of the casing materially reduced but also by reason of the fact that the water-valve seat D is reduced in size, the air-valve seat F, together with the water-valve E and air-valve G may be made correspondingly smaller, thus greatly reducing the size, weight and cost of the entire valve.

It will likewise be seen that the contraction of the stream produced by said cone shaped inlet is very advantageous in minimizing loss of pressure by keeping the stream away from the valve and other mechanism within the casing and preventing eddy currents.

It will likewise be seen that the reduction in the size of the valve-casing also results in a reduction in the amount of water within the casing for the stream to flow through when the valve is open.

What I claim as my invention and desire to secure by Letters Patent is:

1. A valve of the character described, comprising a casing provided with a converging inlet and a straight course thence to the outlet, and a clapper adapted to move out of said course in opening; the outlet being larger than the converged cross-section of the inlet.

2. A valve of the character described, comprising a casing provided with an inlet and a straight course thence to the outlet, said inlet being of smaller diameter than the outlet, and a clapper adapted to move out of said course in opening; the inlet being arranged and adapted to direct the flow in a column through the valve seat and past the valve straight into the said outlet.

3. A valve of the character described, comprising a casing provided with a cone-shaped inlet and a straight course thence to the outlet, and a clapper adapted to move out of said course in opening; the said cone being on the axis of the outlet and diminishing, in the direction of flow, to a diameter less than that of the outlet.

4. A dry pipe valve comprising a casing provided with inlet and outlet openings, and an air-clapper and a water-clapper with seats therefor; said water-clapper seat being of smaller diameter than said outlet opening, and the whole being arranged for the air-clapper and water-clapper to move out of the line of flow of water so as to provide a direct and unimpeded water course through the water seat to the outlet when the valve is open.

5. A valve casing comprising an enlarged body portion, an outlet opening, an inlet in the form of a truncated cone having a base of substantially the same diameter as the outlet opening, and a clapper arranged and adapted in opening to move within said body portion out of the line of flow in which water is projected by said cone; the whole being arranged for the said inlet cone to project the flow as a jet of increased velocity through the enlarged portion into said outlet.

6. A dry pipe valve having inlet and outlet conforming to the size of pipe in which the valve is set, but having its water valve seat of smaller size, combined with a converging nozzle approach from the external inlet, to said water seat, arranged on the axis of the outlet, there being a straight way for the jet thence to the outlet; said water valve being adapted in opening to move clear of said straight way for the jet.

7. The combination with a length of piping of regular diameter, of a valve inserted therein having its valve seat smaller than said regular diameter; means maintaining the valve clapper seated against the fluid pressure when closed; and means for avoiding pressure loss due to smallness of valve when open, comprising the provision of a short jet-forming approach to the valve seat wherein the reduction of size is effected gradually with accompanying increase of velocity; a chamber beyond said seat, having a discharge orifice, into which orifice the jet from the valve seat is projecetd; the valve clapper being mounted in said chamber and arranged to open in the direction of flow so as to move out of the course of said jet from the seat.

8. A valve comprising a casing having external inlet and outlet openings of equal size and an internal chamber with valve and valve seat; the inlet comprising a passage gradually diminishing in cross sectional area from its external opening, and extending a considerable distance into the casing toward the valve seat whereby the flow is discharged thence with reduced cross section and increased velocity in a straight line toward the outlet; the said valve being adapted to move within the chamber between said seat and a position outside of the direct line of flow from said seat to the outlet; the said inlet passage being so co-ordinated with the external outlet opening, as regards shape, size and distance of the latter from the discharge of the inlet passage, that the change of cross-sectional area which a jet of liquid from said inlet passage undergoes in reaching the outlet makes said jet approximately fill, and not exceed the size of, said outlet.

ALBERT J. LOEPSINGER.

Witnesses:
J. H. THURSTON,
E. E. TANNER.